United States Patent [19]

Antekeier

[11] Patent Number: 4,740,003
[45] Date of Patent: * Apr. 26, 1988

[54] VEHICLE QUARTER FENDER

[75] Inventor: Steven A. Antekeier, North Shores, Mich.

[73] Assignee: Fleet Engineers, Inc., Muskegon, Mich.

[*] Notice: The portion of the term of this patent subsequent to Apr. 5, 2005 has been disclaimed.

[21] Appl. No.: 872,552

[22] Filed: Jun. 10, 1986

[51] Int. Cl.$^4$ ............................................. B62D 25/16
[52] U.S. Cl. .......................... 280/153 R; 280/154.5 R
[58] Field of Search .................... 280/154.4 R, 152 R, 280/152.3, 153 R, 159, 154; 403/344, 290

[56] References Cited

U.S. PATENT DOCUMENTS 3,867,049  2/1975  Rice, Jr. .............................. 403/344
4,591,178  5/1986  Mortvedt et al. ............ 280/154.5 R Primary Examiner—John J. Love
Assistant Examiner—Richard Camby
Attorney, Agent, or Firm—Varnum, Riddering, Schmidt & Howlett

[57] ABSTRACT

A vehicle quarter fender (10) is adapted to mount to a vehicle frame (12) through a mounting rod (14) secured to the frame (12) and comprises an arcuate panel (16), a rigidifying bracket (18) and a mounting tube (20). The rigidifying bracket (18) is formed integral with the panel (16), extends along the full width of the panel (16), along a bottom side (44) thereof, and provides the panel (16) with stability along longitudinal, transverse and diagonal axes of the same. The mounting tube (20) is formed integral with a top inside portion (48) of the panel (16) and is adapted to slidably and securely engage the mounting rod (14) to mount the fender (10) to the frame (12).

15 Claims, 2 Drawing Sheets

VEHICLE QUARTER FENDER

FIELD OF THE INVENTION

This invention relates to a quarter fender for a truck or other similar vehicle. More particularly, the invention relates to an integrally molded quarter fender and mounting assembly, wherein the assembly securely mounts the fender to a truck frame with a minimum of mounting assembly on top of the fender.

BACKGROUND OF THE INVENTION

Most passenger automobiles are quipped with spray shields in the form of what are called "fenders" for preventing surface materials, such as mud, pebbles, water and the like from being thrown upwardly, laterally and backwardly by rotating wheels of the vehicle. Most truck-type vehicles, however, such as dual and tandem wheel tractors, are not always so equipped. Since these vehicles are not always provided by the manufacturers with fender structures, road material thrown off by the rotating wheels results in a visually impenetrable spray into the area alongside of the truck, such spray making it dangerous and almost impossible for a following driver to see around and in front of the truck and to thus pass the same. In addition, the rotating wheels throw off road material onto the truck itself, thereby dirtying the vehicle and possibly causing damage to the same. In order to eliminate these driving hazards and to meet basic safety requirements, which may be statutorily imposed, it is necessary for operators to independently provide protective fenders for their vehicles.

To satisfy the above-identified demand for "after-market" quarter fenders, numerous companies have manufactured such fenders and assemblies for mouting the same to the vehicle chassis. For example, quarter fenders and assemblies for mounting the same that have been available are illustrated in U.S. patents to cline No. 4,148,373 and Lockwood, et al 4,377,294, issued Apr. 10, 1979 and Mar. 22, 1983, respectively. The fenders disclosed by these references, as well as other similar types available, generally comprise an arcurately shaped metal or plastic panel which may be formed with longitudinally extending side flanges. The assembly for mounting the fender includes a mounting rod rigidly secured to and positioned perpendicular to the longitudinal axis of the vehicle frame; and a mounting tube rigidly secured to and positioned along a central transverse axis of the panel, slidably engaging the mounting rod and having a longitudinally extending slot. At least one clamp circumscribing the tube, in the region of the slot, compresses the tube in tight engagement with the rod to securely mount the fender to the frame. In order to provide the necessary stability and rigidity to the fender under normal operating conditions of the vehicle, it has been necessary to position the mounting tube transversely across a majority of the full width of the fender. In addition, the mounting tube and other mounting elements are elements separate from the panel itself and have been bolted or otherwise similarly secured to the panel.

Since the market for "after-market" quarter fenders has become very competitive, the aesthetic appearance, as well as the quality of construction, of the fenders, and the mounting assemblies relating thereto, has become very important. Thus, it is aesthetically desirable to construct a quarter fender and mounting assembly with the mounting tube extending transversely over a relatively small portion of the width of the fender and having elements which give optimal stability along longitudinal, transverse and diagonal axes of the fender, but which are hidden from view when mounted to the vehicle. In addition, it is desirable to construct a integrally molded one-piece fender comprising a fender panel and mounting tube.

SUMMARY OF THE INVENTION

A quarter fender is adapted to mount to a vehicle frame through a rod secured to and positioned substantially transversely of a longitudinal axis of the frame. The quarter fender comprises a panel having a longitudinal axis, top and bottom sides and a width; a mounting means formed integral with or rigidly secured to and extending transversely over less than one-half of the width of the top side of the panel and adapted to engage the rod to mount the fender to the frame; and a rigidifying means formed integral with and extending transversely over more than one-half of the width of the bottom side of the panel and for providing rigidity to the fender when mounted the frame. The mounting means includes a tube adaptewd to slidably engage the rod to mount the fender to the frame; and the rigidifying means comprises a rigid plate having a length, longitudinal axes extending along said length and a plurality of stiffening ribs for providing rigidity to the bracket. The stiffening ribs are formed integral with and extend along the longitudinal axes of the plate, axes transverse to the longitudinal axes and axes diagonal to the longitudinal axes.

The mounting means further comprises a sleeve telescopically engaging the tube, on an inner portion thereof, and for adding rigidity to the tube and preventing inadvertent movement of the tube with respect to the rod. In addition, the tube has a longitudinally-extending slot, and the support sleeve has a longitudinally-extending channel aligned with the slot. The fender further includes at least one clamp adapted to slidably engage the tube and compress the tube and the sleeve, in the region of the slot and the channel, to form a tight connection between the tube, the sleeve and the rod, to securely mount the fender to the frame. The fender also includes a front portion, a deflector securely mounted to the front portion and at least one rib extending along an axis extending along the width of the fender and for providing rigidity to the fender.

Another embodiment of the invention is identical to the above-described embodiment with the exception that the mounting means is formed integral with the top side of the panel and the rigidifying means is formed integral with or rigidly secured to the bottom side of the panel. In a further embodiment of the invention, both the mounting means and the rigidifying means are formed integral with the top side and bottom side of the panel, respectively.

BRIEF DESCRIPTION OF THE DRAWINGS

The invention will now be described with reference to the drawing in which.

DESCRIPTION OF THE PREFERRED EMBODIMENTS

Figure 1:
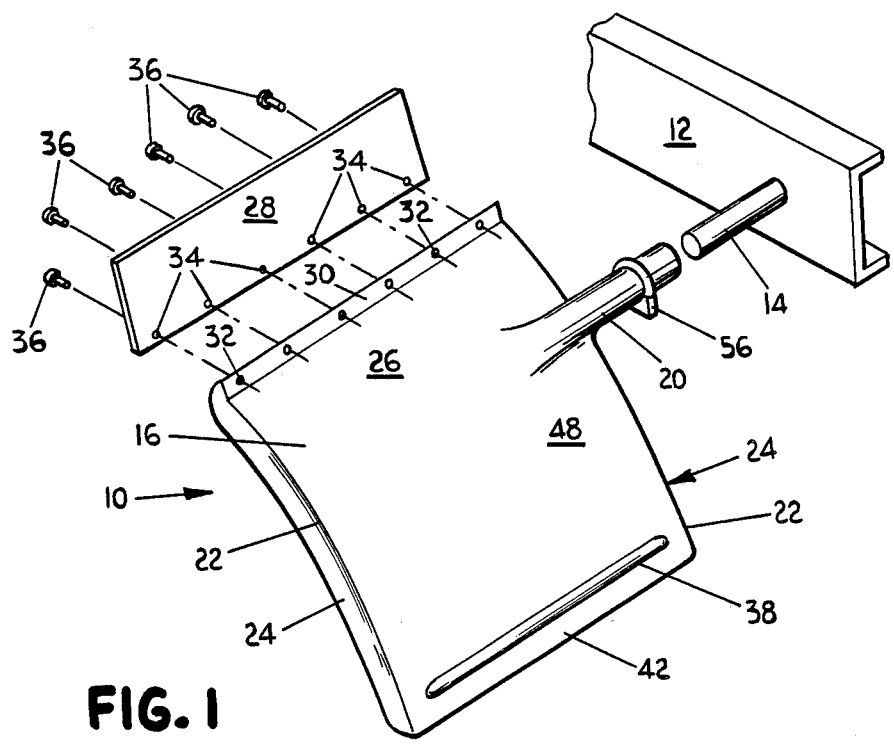
FIG. 1 is an exploded perspective view of a quarter fender in accordance with the invention and mounted to a truck frame.

Referring to the drawings, and in particular FIG. 1, there is shown a quarter fender 10 mounted to a frame 12 of a truck (not shown), or other similar vehicle, through a mounting rod 14. The frame 12 is shown as a substantially C-shaped member, in cross-section, and constitutes that portion of the truck chassis positioned at a point slightly inward of a set of wheels (not shown) mounted to the truck.

The mounting rod 14 used to mount the fender 10 to the frame 12 is rigidly secured to and positioned transversely of the longitudinal axis of the frame. The mounting rod 14 is of the type conventionally utilized and disclosed in prior art patents. For example, as shown in the U.S. Pat. to Lockwood, et al, 4,377,294, issued March 22, 1983, the mounting rod is shown as a cylindrical tube having welded within the inner end thereof a nut forming a threaded socket in the tube. The mounting rod is secured to the frame by a bolt extending through a hole in the frame and set into tight threaded engagement with the nut. Alternatively, it is contemplated that the mounting rod 16 may be of the type disclosed in the U.S. Pat. to Lea, 3,922,003, issued Nov. 25, 1975. Lea shows the mounting rod as an elongated solid bar mattingly engaging and rigidly secured to a top horizontal portion of the frame by a plurality of U-bolts.

Figure 5:
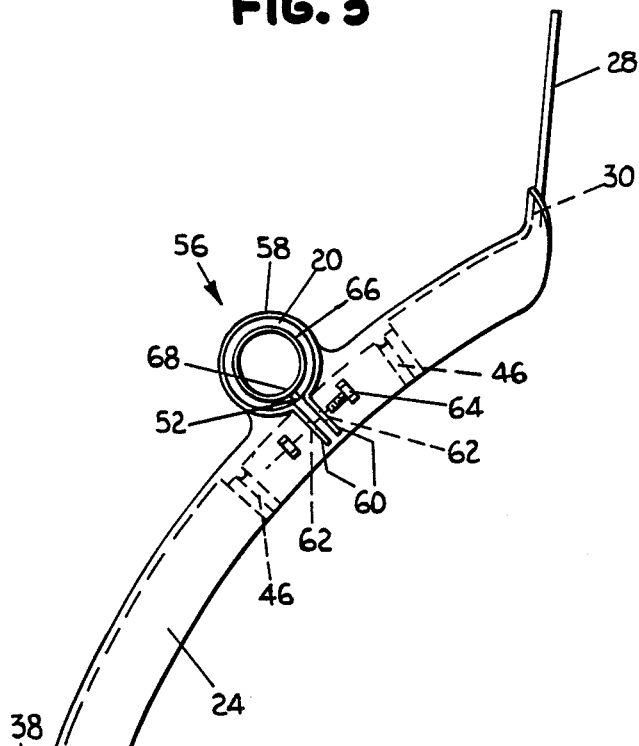
FIG. 5 is a side elevational view of the quarter fender shown in FIGS. 1-4.
Figure 4:
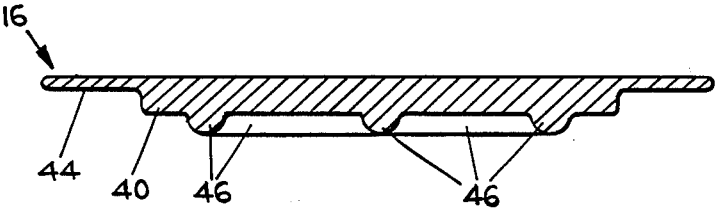
FIG. 4 is a cross-sectional view of the quarter fender taken along lines 4—4 of FIG. 2.

The quarter fender 10 is an injected molded one-piece plastic member comprising a panel 16, a rigidifying bracket or plate 18 and a mounting tube 20. As most clearly illustrated in FIGS. 2 and 5, the panel 16 has a generally arcuate shape, along the longitudinal axis thereof, and a width sufficient to span transversely across the wheel set (not shown). In addition, the panel 16 has the longitudinal sides 22 thereof bent downwardly so as to form a pair of flanges 24 on the panel. The flanges 24 function to aid the fender 10 in its ability to deflect material, such as water and rocks, thrown upwardly by the wheels (not shown), when in operation. In addition, the panel 16 is adapted to mount, on a front transverse side 26 thereof, an additional deflector 28. To this end, the panel 16 includes a substantially planar mounting flange 30 formed integral with the front transverse side 26 of the panel and a plurality of holes 32 extending through the mounting flange. The deflector 28 includes a corresponding number of opening 34 aligned with the holes 32. An equal number of bolts 36 extend through the aligned holes 32 and openings 34 to securely mount the deflector 28 to the panel 16. In addition, the panel 16 can have a first stiffening rib 38 formed integral with and extending along a transverse axis on the rear side 42 of the panel. Further, the panel 16 includes a rib 45 extending along a rear axial edge 47 of the panel. The first stiffening rib 38 and the rib 45 lend rigidity to the panel 16, along longitudinal axis thereof. The first rib 38 also adds to the aesthetic attractiveness of the fender 10.

The rigidifying bracket 18 is formed integral with and extends along the full width of the panel 16, including the flanges 24 of the same, along a bottom portion 44 thereof. The bracket 18 comprises a plurality of second stiffening ribs 46 extending along longitudinal, transverse and diagonal axes of the bracket and the function of which will be hereinafter explained in detail.

Figure 3:
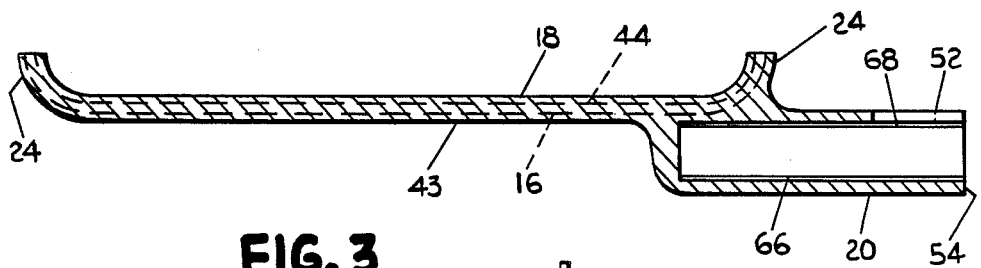
FIG. 3 is a cross-sectional view of the quarter fender taken along lines 3—3 of FIG. 2.

The mounting tube 20 is formed integral with a top inside portion 48 of the panel 16 and is adapted to slidably and rotatively engage and securely clamp to the mounting rod 14 to mount the fender 10 to the truck (not shown). To this end, as shown in FIG. 3, the mounting tube 20 includes, on an inner end 50 thereof, a longitudinally extending slot 52. The slot 52 is of a length to extend from the terminal end 54 of the tube 20 to a point approximately intermediate the same. The slot enables the support tube 20, when mounted to the rod 14, to be compressed or collapsed, within the region of the slot, into a secure clamped engagement around the mounting rod. This collapsing is obtained by the use of at least one compression clamp 56 slidably mounted to and circumscribing the mounting tube 20 in the region of the slot 52. The clamp 56 comprises an arcuate portion 58 having a cruved surface coinciding with and mattingly engaging the curved surface of the mounting tube 20 and a pair of arms 60 formed integral with or rigidly secure to the arcuate portion 58. The arms 60 have a pair of aligned bores 62 extending therethrough. A second bolt 64 extends through the aligned bores 62. Subsequent to slidably engaging the tube 20 with the rod 14, the second bolt 64 is tightened which results in compression of the mounting tube 20 and the secure mounting of the tube to the rod. The telescopic relationship between the tube 20 and the rod 14 enables the fender 10, carried by the tube, to be adjusted angularly as well as axially as is desired or as may be necessary to properly position the fender relative to the wheel set (not shown).

The fender 10 further includes a sleeve 66 having an elongated channel 68 having substantially the same geometric dimensions as the elongated slot 52 of the mounting tube 20. The sleeve 66 is positioned within the mounting tube 20 such that the same tightly circumscribes the sleeve and the channel 68 is set in registry with the slot 52. In this manner, the sleeve 66 is adapted to collapse, along with the support tube 20, around the rod 14 under the compression of the clamp 56 when the second bolt 64 is tightened.

During the manufacturing process, the sleeve 66 can be set in the above-stated position with respect to the tube in two alternative ways. The fender 10 is manufactured by employing a die (not shown) in which is injected plastic. After the plastic has been given time to settle, mating parts of the die are separated and the fender 10 is removed from the die. Preferably, prior to injecting plastic into the die, the sleeve 66 is positioned on that portion of the die corresponding to the support tube 20. Subsequently, the plastic is injected into the die. The result is a fender having an integrally molded tube 20 circumscribing the sleeve 66. In the alternative, rather than forming the support tube 20 about the sleeve 66 as described above, the fender 10 can be manufactured without the sleeve, which subsequently can be incorporated into the fender by forcibly inserting the sleeve into the tube so as to obtain a tight drive fit between the same.

The mounting tube 20 is preferably constructed out of a high-density polyethylene plastic. The sleeve 66 is preferably made of metal. In addition, the rod 14 is preferably constructed of metal. Due to the metal-to-metal contact between the rod 14 and the sleeve 66, the fender is less apt to inadvertently slide and/or rotate on the rod 14, movements more likely to occur if the plastic tube 20 was mounted directly to the metal rod 14. In addition, the metal sleeve 66 provides support to the fender 10 by adding strength to the plastic support tube 20.

Figure 2:
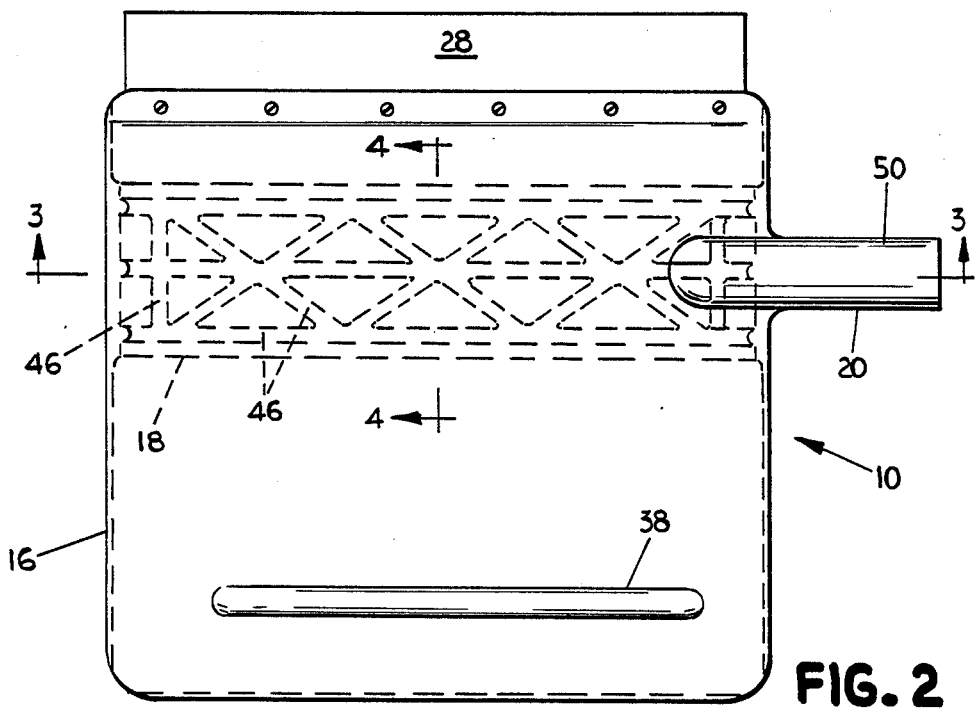
FIG. 2 is a plan view of the quarter fender shown in FIG. 1.

As best illustrated in FIGS. 1, 2 and 3, the mounting tube 20 is positioned over less than one-half of the width of the fender 10. By this construction, the fender 10 is supported from the vehicle frame 12 by a supporting element visible over a relatively small inside top portion 48 of the fender 10. Since the support tube 20 does not extend across substantially the entire width of the fender 10, the fender 10 is relatively aerodynamic and contributes to the aesthetic attractiveness of the truck (not shown) to which it is mounted.

Stability along longitudinal, transverse and diagonal axes of the fender 10 is achieved primarily by the rigidifying bracket 18 which is hidden from view when the fender 10 is mounted to the frame 12. The bracket 18 extends along the full width of the fender 10, along the bottom portion 44 thereof. To aid in rigidifying the fender 10, The bracket 18 has formed thereon a plurality of second stiffening ribs 46. Specifically, the second ribs 46 extend longitudinally and transversely over substantially the full length and width, respectively, of the bracket 18. In addition, the second ribs 46 extend along diagonal axes of the bracket to form a crisscross pattern on the same. In this manner, the second ribs 46 give optimal stability and rigidity to the fender 10 under all normal operating conditions of the vehicle (not shown).

The fender 10, including the mounting tube 20 and the rigidifying bracket 18, is preferably constructed of a high-density polyethylene plastic. It is contemplated, however, that the fender can be made of ABS, a plastic which, in contrast to polyethylene, can be chrome-plated. In addition, the deflector is preferably made of molded polyethylene, rubber, vinyl or other flexible synthetic material. Also, the sleeve 66 is preferably made of metals, such as cold rolled steel, galvanized steel, stainless steel or aluminum.

While the invention will be described in connection with a preferred embodiment, it will be understood that we do not intend to limit the invention to that embodiment. To the contrary, we intend to cover all alternatives, modifications and equivalents as may be included within the spirit and scope of the invention as defined by the appended claims.

The embodiments of the invention in which an exclusive property or privilege is claimed are defined as follows:

1. A quarter fender for a vehicle comprising a panel having top and bottom sides and a width, and adapted to mount to a vehicle frame through a rod secured to and positioned substantially transversely of a longitudinal axis of said frame, wherein the improvement in said fender comprises:
   a mounting means comprising a tube attached to said panel and extending transversely over no more than one-half of said width of said top side of said panel and adapted to engage said rod to mount said fender to said frame; and
   a rigidifying means comprising an elongated plate formed integral with and extending transversely of said longitudinal axis of said panel and over more than one-half of said width of said bottom side of said panel and for providing rigidity to said fender when mounted to said frame.

2. A fender according to claim 1, wherein said tube has a longitudinally extending slot; and
   said fender further comprises at least one clamp adapted to slidably engage said tube and compress said tube, in the region of said slot, into tight engagement with said rod to securely mount said tube to said rod.

3. A fender according to claim 1, wherein said plate comprises a plurality of stiffening ribs for providing rigidity to said plate.

4. A fender according to claim 1, wherein said mounting means comprises a tube adapted to slidably engage said rod to mount said fender to said frame; and
   said plate has a length, longitudinal axes extending along said length and a plurality of stiffening ribs for providing rigidity to said plate.

5. A fender according to claim 4, wherein said stiffening ribs are formed integral with and extend along said longitudinal axes, axes transverse to said longitudinal axes and axes diagonal to said longitudinal axes.

6. A fender according to claim 5, wherein said mounting means further comprises a means for adding rigidity to said tube and for preventing inadvertant movement of said tube with respect to said rod.

7. A fender according to claim 6, where said means for adding rigidity to said tube and for preventing inadvertent movement of said tube with respect to said rod comprises a sleeve telescopically engaging said tube on an inner portion thereof.

8. A fender according to claim 7, wherein said tube has a longitudinally extending slot;
   said sleeve has a longitudinally extending channel aligned with said slot; and
   said fender further comprises at least one clamp adapted to slidabley engage said tube and compress said tube and said sleeve, in the region of said slot and said channel, to form a tight connection between said tube, said sleeve and said rod to securely mount said fender to said frame.

9. A fender according to claim 8, wherein said fender further comprises a front portion and a deflector securely mounted to said front portion.

10. A fender according to claim 8, wherein said fender further comprises at least one rib extending along an axis extending along said width of said fender and for providing rigidity to said fender.

11. A quarter fender for a vehicle comprising a panel having a longitudinal axis, top and bottom sides and a width, and adapted to mount to a vehicle frame through a rod secured to and positioned substantially transversely of a longitudinal axis of said frame, wherein the improvement in said fender comprises:
   a mounting means comprising a tube formed integral with and extending transversely over no more than one-half of said width of said top side of said panel and adapted to engage said rod to mount said fender to said frame; and
   a rigidifying means comprising an elongated plate attached to said panel and extending transversely of said longitudinal axis of said panel and over more than one-half of said width of said bottom of said panel and for providing rigidity to said fender when mounted to said frame.

12. A fender according to claim 11, wherein said plate has a plurality of stiffening ribs for providing rigidity to said bracket.

13. A fender according to claim 12, wherein said mounting means further comprises a means for adding rigidity to said tube and for preventing inadvertent movement of said tube with respect to said rod.

14. A fender according to claim 13, wherein said means for adding rigidity to said tube and for preventing inadvertent movement of said tube with respect to said rod comprises a sleeve telescopically engaging said tube on an inner portion thereof.

15. A fender according to claim 11, wherein said rigifying means is formed integral with said panel.

* * * * *